Oct. 1, 1940.  W. R. SMITH  2,216,357
FOOD PURVEYOR
Filed Oct. 2, 1939  2 Sheets-Sheet 1
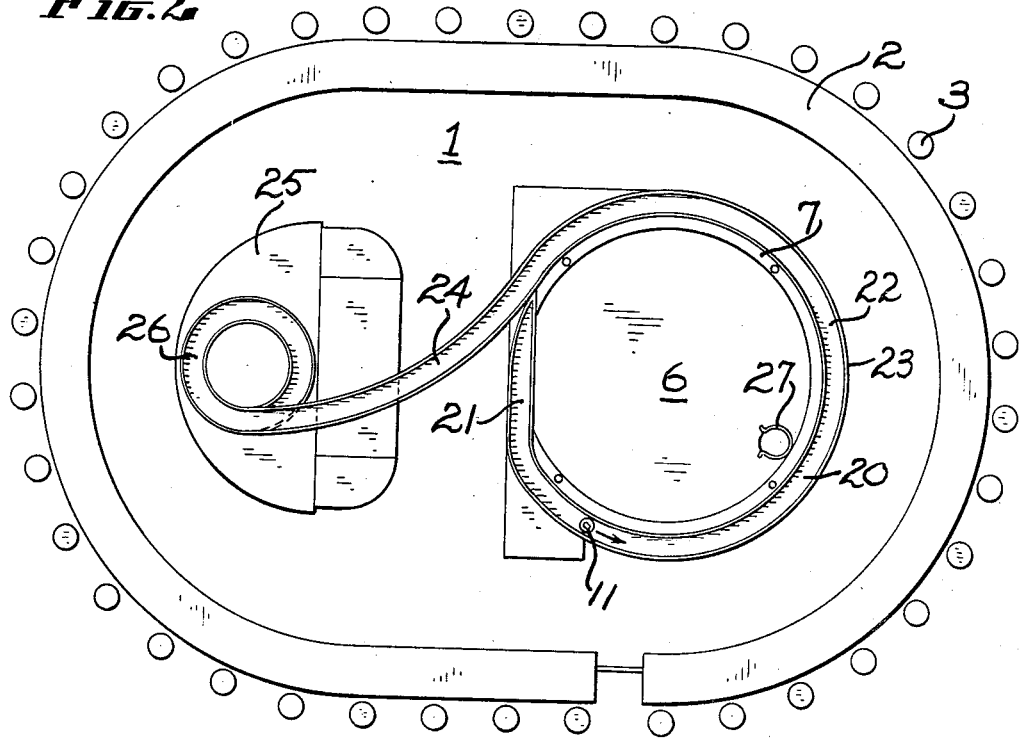
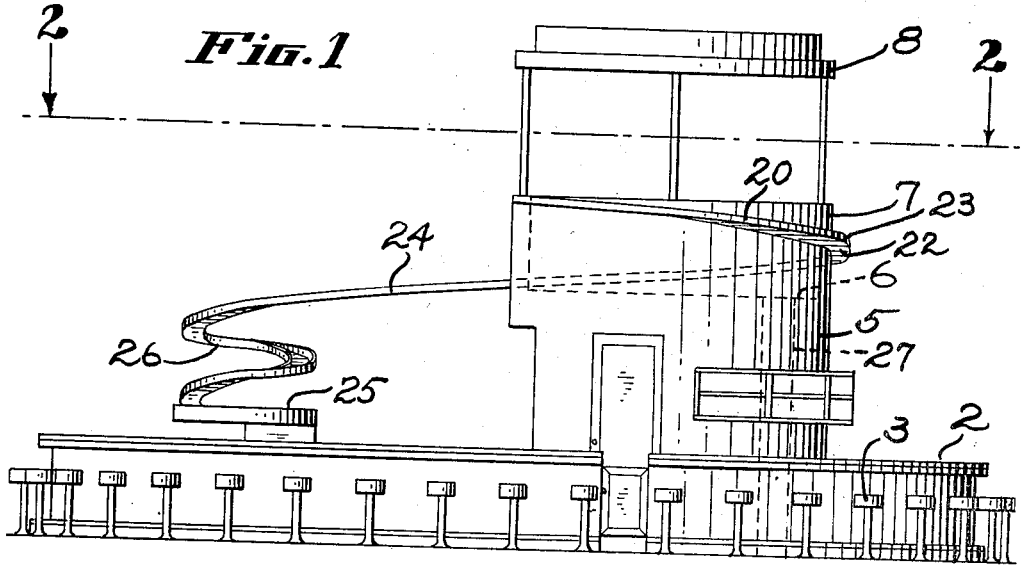
INVENTOR.
Whitney R. Smith
BY Lippincott & Metcalf
ATTORNEYS.

Oct. 1, 1940.   W. R. SMITH   2,216,357
FOOD PURVEYOR
Filed Oct. 2, 1939   2 Sheets-Sheet 2

INVENTOR.
Whitney R. Smith
BY
Lippincott & Metcalf
ATTORNEYS.

Patented Oct. 1, 1940

2,216,357

UNITED STATES PATENT OFFICE 2,216,357

FOOD PURVEYOR

Whitney R. Smith, Pasadena, Calif., assignor to John L. Company, Inc., San Francisco, Calif., a corporation of California Application October 2, 1939, Serial No. 297,423

7 Claims. (Cl. 186—1)

My invention relates to food purveyors and more particularly to such a device usable within relatively small service areas.

Among the objects of my invention are: to provide a food purveying device adaptable for use in places where floor space is at a premium such as, for example, exhibitions, fairs, carnivals, etc.; to provide a device wherein the food may be prepared at an elevated platform and conveyed to a lower level for consumption; to provide a means of stabilizing articles in a gravity conveyor and to provide a food purveying device utilizing a minimum of area within a limited space.

Other objects of my invention will be apparent or will be specifically pointed out in the description forming a part of this specification, but I do not limit myself to the embodiment of the invention herein described, as various forms may be adopted within the scope of the claims.

In the drawings,

Figure 1 is a side view in elevation of one preferred embodiment of my invention.

Figure 2 is a plan view of the device shown in Figure 1 taken as indicated by the line 2—2 in Figure 1.

Figure 3:
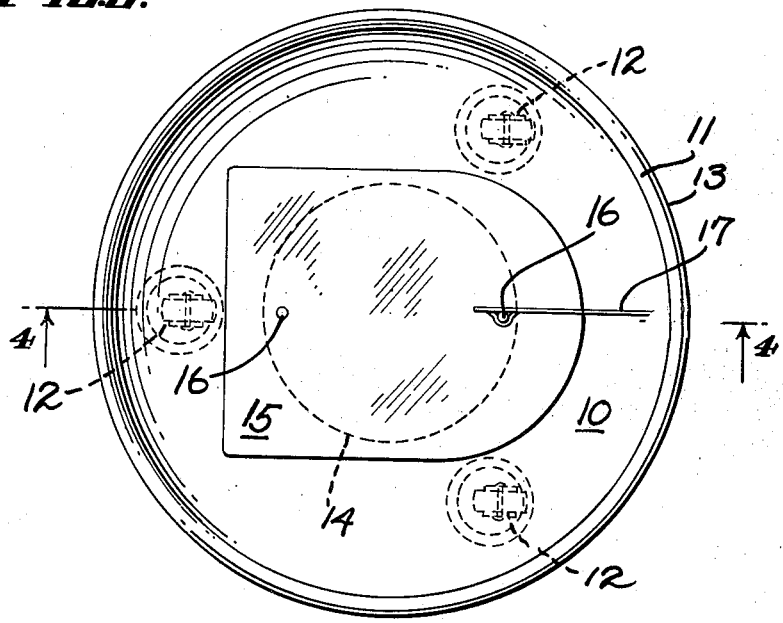
Figure 3 is a plan view of a conveyor pan.

Referring to the drawings for a more detailed description of the preferred form of device illustrated in the drawings, a service floor area 1 is enclosed by a service counter 2 outside of which are placed the usual stools or counter seats 3. In many cases service areas may be large enough to provide sufficient workroom for the preparation of food without undue expense, but where the rental price of the service area is high such as for example, in the fairs now in progress at both New York and San Francisco, maximum use of the space provided is an economic necessity. Consequently, I have designed my food preparation system in such a manner that it takes full advantage of available space over and above the service floor area in such a manner that it will not interfere with the service of food at floor level.

I therefore provide a cylindrical structure 5 supporting elevated platform 6 surrounded by rail 7, which may or may not be provided with a roof 8 in accordance with the headroom available. I prefer, however, to utilize the roof if possible in order that the food and various utensils on the elevated platform may be covered when the device is not in use. Elevated platform 6 is utilized for the preparation of food such as for example, sandwiches, and the area beneath the platform 6 may then be utilized for supplies or other storage, dish washing or other necessary work, thus making double use of the portion of the service area occupied by the structure 5.

Figure 4:
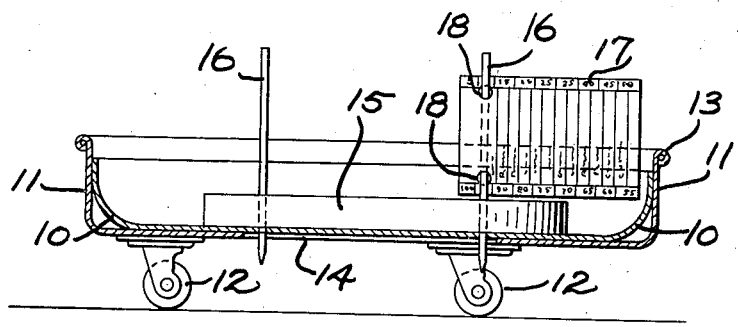
Figure 4 is a cross-sectional view of the conveyor pan with food shown therein in elevation.

As the operators on the elevated platform 6 complete their orders, these orders usually sandwiches, are deposited in a paper plate 10 which in turn is placed within a conveyor pan 11 as shown in Figures 3 and 4. Conveyor pan 11 is provided on its lower surface with castors 12 preferably three in number, and with a rolled edge 13. Pan 11 is also provided on the lower surface thereof with an aperture 14 so that a sandwich or similar article 15 may be anchored to the pan by means of skewers 16. These skewers are driven through the sandwich 15, through the bottom of the paper plate 10 and project through aperture 14 into the space beneath the pan 11. Thus the sandwich 15 is prevented from moving laterally and, in order to prevent the sandwich from any upward motion during transport I utilize additional means to hold the sandwich halves together, this means being preferably a price card 17 having spaced holes 18 therein slipped over at least one of the skewers and pushed downwardly to approximate contact with the top of the sandwich or other article. The friction of the card 17 against skewers 16 prevents the sandwich halves from separating during transport. Of course I do not wish to be limited in the utilization of a price card for this purpose as it will be obvious to those skilled in the art that any member slidable on the skewers will perform this same function. The price card is merely a convenient member available and invariably accompanies an order.

After the sandwich has been placed in the paper plate and the plate in the pan stabilized by means of the skewers, the pan and its contents is then placed in a chute or slide 20 for delivery, the chute having a relatively level initial portion 21 in line with the top of rail 7. The chute then continues around the platform along a circular portion 22 with a continuous downward gradient so that the pan will travel within the chute due to gravity. The chute is provided with raised edges 23 to maintain the pan at all times within the chute. The chute then leaves the vicinity of the platform structure and passes over other portions of the service area along a portion 24 sufficiently elevated to allow persons such as waitresses or waiters walking on the service floor area to pass beneath without contact therewith. I then provide a service platform 25 raised from the service floor area at serving height. The chute upon arriving over this platform descends to the platform in a series of relatively tight spirals 26, the pans being delivered directly on to the surface platform by gravity the entire way from the elevated platform.

The paper plate is then removed from the pan by the waitresses, the skewers removed from the plate, and the food and the price card is delivered to customers sitting around counter 2. The pans may then be placed in any convenient elevator as indicated by tube 27 within structure 5 for return to the elevated platform.

It should be pointed out that while I have shown the device as utilizing a paper plate of substantially the same diameter as the pan, incapable of lateral motion within the pan, that my invention also includes the use of smaller paper plates with complete stabilization, because if skewers 16 are driven through the paper plate adjacent the edges of aperture 14, then the paper plate 10 cannot move laterally within the pan due to the engagement of the projecting ends of the skewers with the edges of the aperture.

Thus, it will be seen that I have provided a means for transporting food from an elevated platform to a service platform by means of a gravity conveyor wherein the pans conveying the food contain means for stabilizing the food within the pan.

It will also be seen that the food purveying device of my invention as shown and described herein makes efficient use of limited floor space, and furthermore is attractive in design and has an eye value contributing greatly to the appeal of the device from an advertising standpoint.

I claim:

1. Means for purveying food in a limited space comprising a service area, a service platform reachable by persons within said area, a circular elevated platform erected within said service area for preparing food, a chute having raised edges starting at said platform, and encircling the same with a continuous downward gradient and then extending away from said platform to a predetermined point with sufficient clearance for persons walking within said service area to pass thereunder, said chute then dropping to said service platform in a series of relatively tight spirals.

2. Means for purveying food in a limited space comprising a service area, a service platform reachable by persons within said area, a circular elevated platform erected within said service area for preparing food, a chute having raised edges starting at said platform, and encircling the same with a continuous downward gradient and then extending away from said platform to a predetermined point with sufficient clearance for persons walking within said service area to pass thereunder, said chute then dropping to said service platform in a series of relatively tight spirals, and a service counter surrounding said service area.

3. Food conveyors for use on an inclined chute comprising round pans mounted on castors, said pans having an aperture in the bottom thereof, a paper plate within said container for holding food such as a sandwich, for example, to be purveyed, skewers driven through said food and said paper plate and into said aperture to stabilize said food and plate in a fixed position in said conveyor during passage down said chute, and a price card engaging one of said skewers above said food to prevent upward motion thereof.

4. Food conveyors for use on an inclined chute comprising round pans mounted on castors, said pans having an aperture in the bottom thereof, a paper plate within said container for holding food such as a sandwich, for example, to be purveyed, skewers driven through said food and said paper plate and into said aperture to stabilize said food and plate in a fixed position in said conveyor during passage down said chute, and laterally extending means slidable on one of said skewers above said food to prevent upward motion thereof.

5. Means for purveying food in a limited space comprising a service area, a service platform reachable by persons within said area, a circular elevated platform erected within said service area for preparing food, a conveyor starting at said platform, and encircling the same with a continuous downward gradient and then extending away from said platform to a predetermined point with sufficient clearance for persons walking within said service area to pass thereunder, said conveyor then dropping to said service platform in a series of relatively tight spirals.

6. Means for purveying food in a limited space comprising a service area, a service platform reachable by persons within said area, a circular elevated platform erected within said service area for preparing food, a chute having raised edges starting at said platform, and encircling the same with a continuous downward gradient and then extending away from said platform to a predetermined point with sufficient clearance for persons walking within said service area to pass thereunder, said chute then dropping to said service platform in a series of relatively tight spirals, and a return elevator extending vertically from said service area to said elevated platform.

7. Means for purveying food in a limited space comprising a service area, a service platform reachable by persons within said area, a circular elevated platform erected within said service area for preparing foods, a chute having raised edges starting at said platform, and encircling the same with a continuous downward gradient and then extending away from said platform to a predetermined point with sufficient clearance for persons walking within said service area to pass thereunder, said chute then dropping to said service platform in a series of relatively tight spirals, walls enclosing the space between said service area and said elevated platform, and a return elevator extending through said space from said service area to said elevated platform.

WHITNEY R. SMITH.